United States Patent [19]

Coplan

[11] Patent Number: 5,158,581
[45] Date of Patent: Oct. 27, 1992

[54] FLUID SEPARATION MEMBRANE MODULE WITH HOLLOW FIBERS HAVING SEGREGATED ACTIVE SURFACE REGIONS

[76] Inventor: Myron J. Coplan, 47 Speen St., Natick, Mass. 01760-4114

[21] Appl. No.: 736,761

[22] Filed: Jul. 29, 1991

[51] Int. Cl.⁵ .................... B01D 53/22; B01D 63/02
[52] U.S. Cl. ........................................ 55/16; 55/68; 55/158; 210/321.81; 210/321.9
[58] Field of Search ............... 55/16, 68, 158; 210/321, 81, 321.9

[56] References Cited

U.S. PATENT DOCUMENTS

| | | |
|---|---|---|
| 4,031,012 | 6/1977 | Gics .................... 55/158 X |
| 4,207,192 | 6/1980 | Coplan et al. .......... 55/158 X |
| 4,293,419 | 10/1981 | Sekino et al. ......... 55/158 X |
| 4,508,548 | 4/1985 | Manatt ................ 55/16 X |
| 4,631,128 | 12/1986 | Coplan et al. ........ 55/158 X |
| 4,676,808 | 6/1987 | Coplan ............... 55/158 |
| 4,750,918 | 6/1988 | Sirkar ............... 55/158 X |
| 4,752,305 | 6/1988 | Johnson .............. 55/16 |
| 5,013,331 | 5/1991 | Edwards et al. ....... 55/158 X |
| 5,013,437 | 5/1991 | Trimmer et al. ....... 55/158 X |
| 5,015,269 | 5/1991 | Garrett et al. ....... 55/16 |

FOREIGN PATENT DOCUMENTS 1494920 7/1989 U.S.S.R. ...................... 55/158

*Primary Examiner*—Robert Spitzer
*Attorney, Agent, or Firm*—Kane, Dalsimer, Sullivan, Kurucz, Levy, Eisele and Richard

[57] ABSTRACT

A membrane module for separation of a fluid mixture comprises a containment vessel enclosing a bundle of hollow fiber membranes having all fibers potted in a common end-plug located at a first end where all fiber bores are open. A fluid-impervious barrier is disposed transversely to the bundle axis near the second end, distal from the end-plug, and forms a fluid-tight seal with the interior surface of the vessel so that the interior volume is divided into two zones not in direct fluid communication. The barrier thereby segregates the external surface of each fiber into a first region lying in the zone between the end-plug and the barrier and a second region lying in the zone between the barrier and the second end. The unobstructed bore of each fiber is open only in the end-plug so that permeate may be collected only from that end of the bundle for removal from the module. The fiber portions in the second zone may be either in the form of re-entrant loops or sealed stubs so that, having no open ends, fluid communication between their external surfaces and their bores is only via passage across the hollow fiber membrane wall.

11 Claims, 5 Drawing Sheets

FLUID SEPARATION MEMBRANE MODULE WITH HOLLOW FIBERS HAVING SEGREGATED ACTIVE SURFACE REGIONS

BACKGROUND OF THE INVENTION

1. Field of the Invention.

The present invention pertains to the design of a hollow fiber membrane bundle to be used for selective separation of components of a fluid mixture. It is especially adaptable to the separation of the components of a mixture of gases and will be described in that context, although it should be understood that the invention per se is applicable to any fluid separation process.

In a typical gas separation a gas mixture such as air is fed at some controlled pressure to an "upstream" surface of a membrane. The membrane material acts as a selective barrier or transport medium, so that one or more of the components of the mixture move(s) through it at a higher rate than one or more other component(s).

Thus, a gas composition emerges on the "downstream" surface of the membrane (permeate) enriched in one or more components of the feed mixture, while the gas remaining on the "upstream" surface (raffinate) is depleted in same. Alternatively, it can be said that raffinate has been enriched in the component(s) less favored for permeation through the membrane.

Several chemical and physical factors influence the separation: Chemical properties and physical morphology of the membrane material, as well as the chemical and physical properties of the gases to be separated all play roles in determining how and whether a membrane will perform a useful separation. The relevance of many of the important variables may be generally summarized as follows, recognizing that the issues may be rather more complex than stated.

(1) If the membrane comprises a material having a system of very fine interconnected pores the passage of smaller gas molecules may be favored over the passage of larger ones by a form of size exclusion.

(2) In a porous material whose pore diameters are substantially smaller than the mean free path of gas molecules in Brownian motion, those of lower molecular weight will move more rapidly through the material than those of higher molecular weight in proportion to the square roots of their molecular weights. This mechanism is known as Knudsen flow separation and is illustrated in U.S. Pat. No. 4,482,360.

(3) If the membrane material is nonporous, such as a pinhole-free fully dense polymer film, different gases have different solubilities and different diffusion rates through the solid. Net flow rate through the membrane is the product of solubility and diffusivity. Different gases having different "solution-diffusion" coefficients will exhibit different net permeation rates. It is noteworthy that the absolute flow rate of gases through pores as such as in Knudsen flow is several orders of magnitude higher than the flow rate experienced in solution-diffusion.

(4) Some of the same factors which affect the interaction of a gas molecule with those comprising a dense membrane can also be at work in a porous material where only size exclusion or Knudsen separation might have been expected. Interaction between gas molecules and those comprising the pore solid surface may be such as to induce selective enhancement of the flow of one gas component over that of another by the mechanism called "surface flow" separation.

2. Prior Art.

The membrane material may be polymeric or non-polymeric. For instance, certain metals, palladium being one, have a remarkable capacity to absorb hydrogen. Foils consisting of these metals are excellent media for selectively separating hydrogen from mixtures with other gases, as illustrated in U.S. Pat. No. 3,428,476. In respect to size exclusion and Knudsen flow, there are many forms of microporous ceramic and glass materials as well as microporous polymers which are effective.

Dense polymers are most widely employed for gas separation either as flat sheets spiral wound flat sheets or hollow fibers. The latter are most preferred.

As for fine structure or morphology of the membrane material, there are four or five distinguishable situations. The simplest one is that in which the membrane is simply a fully dense single polymer in the form of a sheet or hollow fiber. Many polymers have been applied this way as in U.S. Pat. Nos. 3,415,038, 3,335,545, 3,798,185, and 4,132,824 among many others.

Another morphology is that of the asymmetric membrane which is comprised of a single polymer that has been formed into a sheet or fiber having a relatively thin fully dense surface supported by a much thicker highly porous region. In hollow fibers the skin is most often on the outside of the fiber, but it is not unusual for it to be on the inside. U.S. Pat. Nos. 3,674,628, 4,127,625, 4,239,793, and 4,472,175 are exemplary.

A variant of asymmetric membrane is the so-called "occlusively coated" membrane. Here, an imperfect ultrathin barrier layer skin is treated with a solution of a highly permeable low-selectivity material which plugs surface flaws and pinholes in such a way that the selective properties of the parent polymer skin can be expressed. U.S. Pat. Nos. 4,230,463 is illustrative of this situation.

Another useful structure for gas separation membranes is the so-called "composite" wherein a thin fully dense film of selectively permeable polymer is formed on a porous substrate, comprising a different polymer. U.S. Pat. Nos. 3,616,607, 3,980,456, and 4,826,599, are illustrative. The substrate is not responsible for the selective permeation of a gas mixture, but rather acts as an inert support for the ultrathin permselective skin. In hollow fibers, the dense film is almost always formed on the outside surface of the substrate.

It has now also been found that a permselective layer can be formed as a fully dense region at neither the outer nor inner surface of the fiber wall, but as a zone within the pore system comprising the wall of a hollow fiber. U.S. Pat. No. 4,838,904 is illustrative of this situation.

Still another method of conferring gas selectivity on a non-selective porous substrate hollow fiber has been described in U.S. Pat. No. 4,784,880. Here a bundle of fibers having a microporous barrier layer surface surmounting a porous main body is treated with a solution admitted into the bores while evaporation is promoted at the barrier layer surface so that the barrier layer is densified or filled with solute.

When hollow fibers are used for gas separation, pressurized feed may be applied either to their external surfaces or to their bores. When the former mode is used, the fibers are assembled as a compact bundle installed in a pressure-tight containment vessel, ("shell"). The bundle and shell comprise a "module". Many such have been described but U.S. Pat. No. 4,315,819 is illustrative here.

When the pressurized feed gas is admitted into the module to contact the outer surfaces of the fibers the mode is known as shell-side feed to distinguish from the case where pressurized gas might be delivered into the fiber bores, which would be called bore-feed, as in U.S. Pat. Nos. 4,734,106 and 4,881,955. In the bore-feed mode bundle geometry is not a particularly consequential factor in determining good fluid dynamics of the overall process. In shell-side feed uniform controlled flow of feed gas over the outer surfaces of the fibers is critical.

Fiber bundles have been assembled in a number of geometries which may be roughly divided into two types. In one such type, a number of cut lengths of fiber are gathered together into an essentially straight parallel array. This is illustrated in U.S. Pat. Nos. 4,315,819 and 4,929,259. The other principal bundle style involves assembling initially uncut lengths of fiber by winding them on a frame or mandrel which rotates while the fibers are caused to reciprocate repetitively from end to end of the bundle. In so doing layers of fiber wraps are built up wherein fiber paths at each end of the bundle form re-entrant loops. A prevailing way of accomplishing this involves winding overlapping helices one upon another as in U.S. Pat. Nos. 4,430,219 and 4,631,128.

Whether the bundle is formed from cut lengths or wound in some fashion from continuous uncut lengths, at least one end of the bundle is potted into a polymer plug or thick sheet and the fibers and plug are sliced or perforated in some way to open all the fiber bores to permit exit of fluid permeated to the bore. The potting plug makes a gas-tight seal to the containment shell. U.S. Pat. Nos. 4,061,574 and 4,207,192 are exemplary.

Quite often both ends of the bundle are potted. When this is done there is the option of opening fiber bores at one end or both ends and there are different reasons for doing each. When a bundle has been assembled from cut lengths of fiber it is almost invariably potted at both ends. Either both plugs are sliced to open the bores at each end, or one end may be left unsliced in order to keep sealed the initially open fiber ends embedded in that plug.

When the bundle has been assembled from continuous uncut lengths which follow re-entrant paths at each bundle end, potting of the uncut end is sometimes used as an expedient to aid in bundle handling. This is illustrated in U.S. Pat. No. 4,781,834. However, unlike bundles assembled from cut lengths, a bundle having re-entrant loops of fiber at each end does not require potting both ends in order to seal off already cut ends when it is desired to have only one end of the bores open.

For either bundle style, however, end-use operational considerations ma dictate that both ends be potted and sliced because this permits permeate to exit through twice as many outlets and the bore length to be traversed by permeate is halved. Both effects may improve flow dynamics in some cases. U.S. Pat. Nos. 3,442,002 and 4,451,369 represent widely different manifestations of this arrangement.

The two-ends-open design offers another functional option. One end may be used for the introduction of sweep gas into the bore while the other end provides the outlet mean for both permeate and sweep gas. "Sweeping" tends to influence transmembrane gas composition equilibria in such a way as to improve net separation efficiency. The use of sweep gas may be desirable whether the bundle is an array of straight parallel fibers or an assembly of helically wound fibers or any other configuration.

In the cases where it is desired to have fiber bores opened only at one potted bundle end, there are two possible situations. As has already been stated, when cut lengths are assembled into a bundle open ends of fiber need to be sealed off at one end and embedding this end in potting is a convenient way to do this while also stabilizing the bundle configuration. In the case where the bundle is assembled from continuous fiber lengths with re-entrant loops at each bundle end, there is no need and there may well be a disadvantage to potting more than the one end at which bores are to be opened. U.S. Pat. No. 3,660,281 is exemplary.

Whatever the bundle style or the preferred potting and slicing alternative, when feed gas is admitted under pressure into the module and contacts the outer surfaces of the fibers one or more component(s) of the feed gas permeates from that surface across the fiber wall to its bore. Non-permeated gas is allowed to exit the module and constitutes the raffinate. The admission of feed may be via a perforated tube lying in the central axis of the bundle and the flow of gas is radially outward toward the inner surface of the containment vessel. This is illustrated in U.S. Pat. No. 3,422,008.

However, a preferred arrangement provides that feed enters the bundle at one end where it is induced to disperse radially before following a path more or less parallel to the fiber axes. Permeation occurs and the residual gas becomes a raffinate which is allowed to exit the bundle at the end opposite the feed region. This is illustrated in U.S. Pat. No. 4,781,834.

Contents of the bore must of necessity flow parallel to the fiber axis toward an open end of the bore. In the situation where feed flow is directed radially within the bundle the process is described as being operated in the cross-flow mode. Such a situation requires that there be a feed distributer or raffinate collector tube at the center of the bundle. This is not the case where feed flow is in a direction parallel to the bundle axis. This bundle may have a support element in the bundle axis or not. In parallel flow there are two options: 1) the case where permeate flow in the bore and shell side feed flow are in the same direction, known as parallel coflow, and 2) the case where the two flows are in opposite direction, known as parallel counterflow. For most uses parallel counterflow is considered the superior option.

Very few practical membrane separations are operated with only a single module. Rather, an installation may have from at least two up to several hundred modules linked together by plumbing which directs flows from one group of modules to another in a number of steps. The system is in effect organized into separate but interconnected zones, an arrangement described as a cascade.

Whether the system is so arranged or not it frequently is the case that several bundles are housed in a common pressure shell. In U.S. Pat. No. 4,632,756 a group of bundles receives a common feed in parallel and therefore such a group comprises a single zone. In U.S. Pat. Nos. 4,451,369 and 4,508,548, however, bundles are arranged so that the raffinate from a first bundle is the feed for a second bundle. In U.S. Pat. No. 4,508,548 the pressurized gas flows in the fiber bores, in U.S. Pat. No. 4,451,369 the feed and raffinate are on the shell side. In either instance, however, the effect of the multi-bundle arrangement is to provide two or more zones inside a common containment vessel (i.e. pressure shell).

The multi-zone principle has been extended to the design of individual bundles. In U.S. Pat. No. 4,676,808 fibers are wound on a mandrel and layers are built up. After a sufficient thickness of wraps has been accumulated a thin gas-impermeable film is applied over the first thickness of wraps and fiber winding continued until the desired total amount of fiber has been assembled. Ultimately, potting and slicing provides that the fibers within the bundle are actually segregated into zones which are separated by the film.

In U.S. Pat. No. 4,220,535 a different kind of zoning is created within a single bundle. A barrier is formed transverse to the bundle axis closer to one of its ends than the other. The bundle is potted at both ends and fiber bores opened at both bundle ends. Separate perforated tubes lie in the central axis of the bundle, each traversing from a closed end adjacent the barrier through a bundle zone and then through one or the other potting plug. Thus each bundle zone is accessible to the flow of fluid into or out of its own central tube.

The barrier in U.S. Pat. No. 4,220,535 acts essentially as a flow director for unimpeded fluid communication between the active fiber surfaces in each of the two zones. Being a two-ends-open configuration the fibers are susceptible to having a sweep fluid propelled down their bores from one end to the other. Feed fluid enters the module via one central tube through a first end-plug and flows radially over the active surfaces of fibers in a first zone. After moving through the bundle to the shell surface in the first zone, the residue of the feed then passes between the shell and the barrier into the second zone and flows radially toward the second perforated central tube for passage from the bundle through the second potting plug. Thus, although there are two fiber zones the active surfaces of the fibers in each zone are in direct fluid communication.

Barriers introduced across the bundle in regions other than the ends have also been employed for other reasons than to create zones with different feed qualities. Bundles made from cut fiber lengths are notorious for having regions of varying fiber packing density resulting in a tendency for feed to flow irregularly within the bundle. Transverse baffle elements might be expected to prevent flow bypassing some regions and favoring others. U.S. Pat. No. 4,367,139, therefore, teaches partial barriers disposed transversely to the bundle axis at selected locations in order to induce uniform flow among the fibers in the parallel flow mode. All active fiber surfaces are, however, in fluid communication.

3. Summary of Prior Art

Although some variables in bundle design are interactive so that choosing an option for one variable limits choice in another, it is still useful to summarize the foregoing as follows:

| Factor | Option | |
|---|---|---|
| separation mech. | size exc/ Knudsen/solution-diff/surface flow | |
| fiber type | dense/asymmetric/composite/occlusive coated | |
| selective surf. | inside | outside |
| bundle style | straight cut length | uncut re-entrant loop |
| potting | both ends | one end only |
| bore open at | both ends | one end only |
| feed | to the bore | shell-side |
| flow in bundle | radial | axial |
| bore/shell flow | coflow | counterflow |

| Factor | Option | |
|---|---|---|
| zoning | radial | axial |

OBJECTIVES OF THE INVENTION

This invention pertains to a configurational modification of a hollow fiber bundle for use in gas separations operated in the shell-side co- or counterflow modes. Namely, it provides for segregating the active surface area of all fibers into two zones isolated from each other to prevent fluid communication between said zones except via unobstructed fiber bores which traverse the two zones. One zone is bounded by sealed-end fibers or re-entrant loops at one extremity and a barrier at the other. The second zone is bounded by the same barrier and a bundle potting end-plug carrying the fiber open bore ends. Fluid permeating to the fiber bores in the main active surface region has access to these open ends. The fiber portions comprising the zone in which re-entrant loops or sealed ends appear provide a region for: a) introducing sweep gas, b) permeation by a mode different from that of the main active surface, or c) extracting bore fluid. These steps are regarded as having a salutary effect o separation efficiency and when practiced have required systems with bundles deployed in separate zones. The invention makes it possible to provide two segregated zones within one and the same module to carry out two separate processes.

In respect to one such, the invention provides a means to employ the same hollow fiber to effect in serial order two mechanisms of separation. In respect to a second factor, the invention provides means for introducing sweep gas to the fiber bore efficiently and effectively in a bundle having open fiber bores at only one end. In respect to a third factor, the invention makes possible controlled removal of permeate at both bundle ends. Details of the invention design, methods for implementing the design, and various uses of the bundle thereby produced will be made clear hereunder.

GENERAL DESCRIPTION OF THE INVENTION

1. The Design.

A hollow fiber bundle having all fiber bore openings in a common potting end-plug is fabricated in typical fashion with one exception to be described. The preferred bundle style is that made from continuous fibers so that the bundle ends comprise re-entrant fiber loops although bundles made from cut lengths of fiber are also contemplated by this invention provided one end of the fibers is sealed appropriately. Whether a re-entrant loop bundle or a cut length bundle, one end is potted and sliced in conventional fashion so that all fiber bore openings appear at one bundle end in a common potting end-plug.

The departure from prior art designs resides in the fact that in addition to there being a single potting end-plug there is also formed within the bundle a gas impervious barrier transverse to the bundle axis near the end opposite said end-plug. The barrier may be of typical potting material or not, but rather than forming a typical end-plug said barrier material does not reach all the way to the end of the bundle. Rather, there is left exposed and unpotted a controlled amount of the fiber length at the end of the bundle opposite to that at which fiber bores are opened in the common end plug. This distinctive feature of the instant invention will be illustrated by highly simplified diagrams showing how single fibers would appear in prior art bundles compared to the arrangement of the instant invention.

Prior Art Configurations

FIGS. 1a through d represent some of the alternative prior art situations in respect to bundle geometries and potting arrangements where no barrier is disposed within the bundle.

Invention Configurations

Figure 5A:
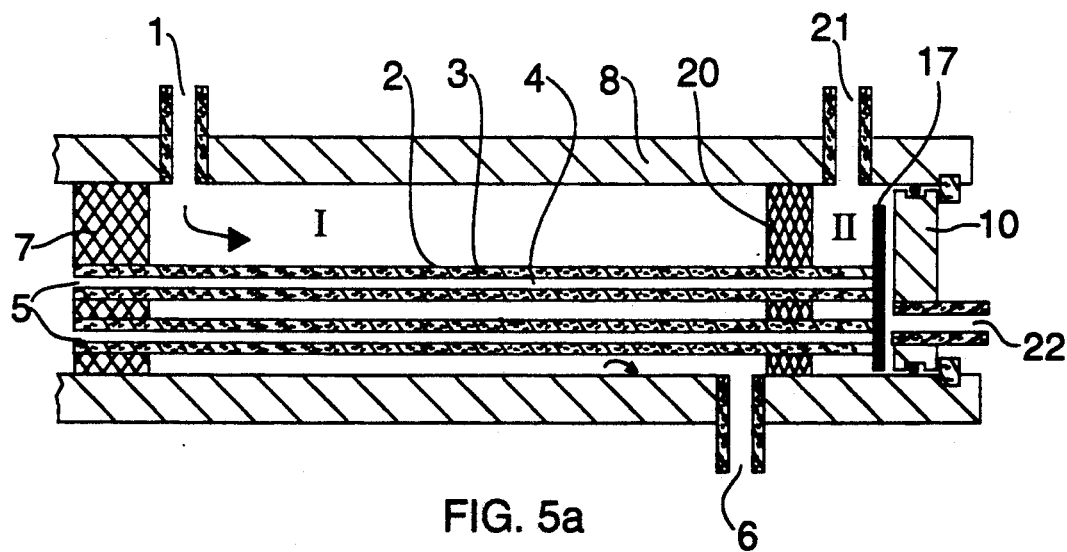
Figure 5B:
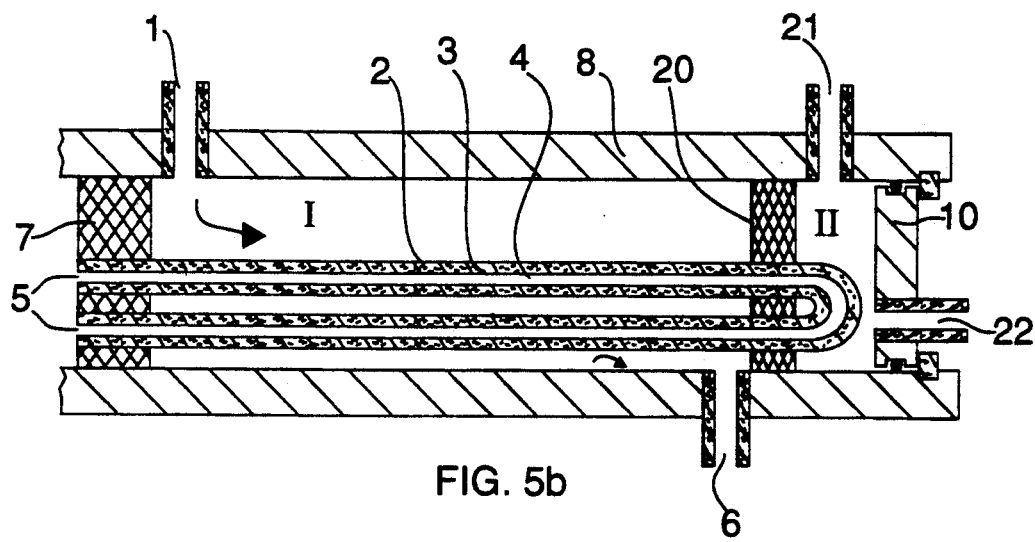

FIGS. 5a and 5b represent two alternative situations in respect to the configuration which characterizes this invention.

Figure 6:
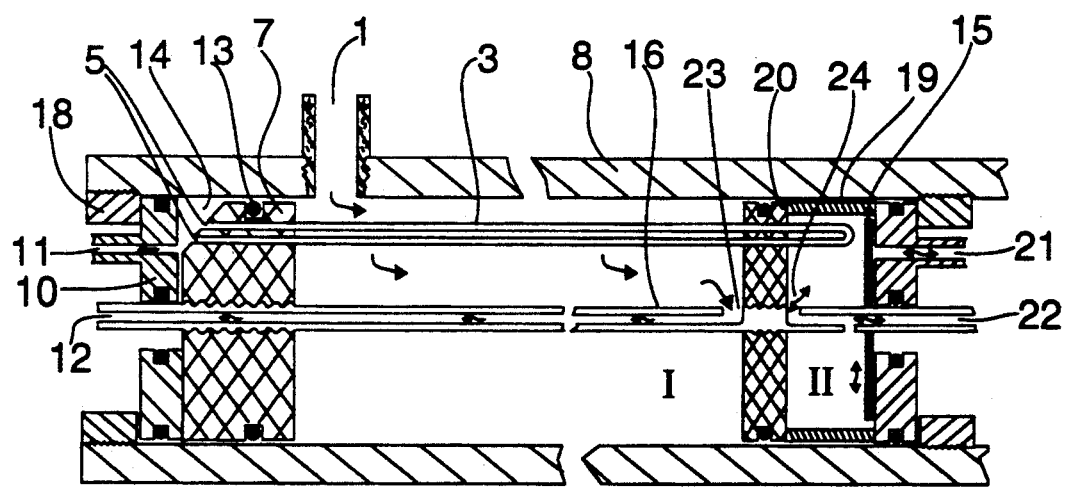

FIG. 6 illustrates the instant invention diagrammatically showing in detail a preferred embodiment of this invention comprising a bundle and pressure shell assembled as a module.

DISCUSSION OF THE FIGURES

In all the figures common numerals are used for common features. They are only diagrammatic and therefore in many instances irrelevant details have been left out, eg: single fibers are used to represent whole bundles; means for making a fluid-tight seal between the inner surface of the shell and an end-plate or end-plug such as "O-rings" are not shown in all the diagrams; typical arrangements for collecting permeate from fiber bores in a chamber beyond the end-plugs are not shown in all figures; bolts, flanges and plumbing connections are not shown. But one familiar with the art will not be misled or confused by such simplifications.

Access port 1 admits feed gas to the module where it contacts surface 2 of hollow fiber 3. Partial separation of feed components occurs on permeation through the fiber wall to its bore 4. Permeate flows toward bore open end 5 and eventually leaves the module via egress port 11. Feed residue (raffinate) exits via module access port 6 in the shell 8 or access port 12 in an end-plate 10.

The fibers are embedded in end-plug 7 which is in gas-tight juxtaposition with the inner surface of the pressure shell 8. Where feed is dispersed radially within the bundle it is distributed via core tube 9. Where detail is shown, as in 1d, an O-ring 13 provides a fluid seal between the end-plate and the shell, and in 1a there is shown a permeate collection chamber 14.

Figure 1A:
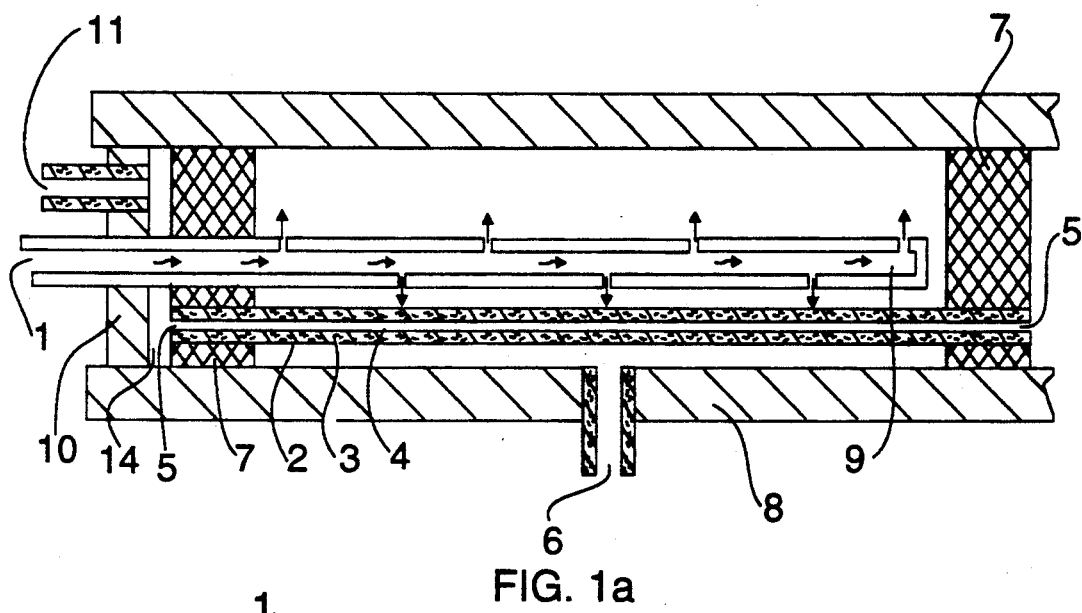

FIG. 1a. (Prior art). Pressurized gas enters at 1 into distributor tube 9 from which it flows radially towards the inner surface of pressure shell 8. The distributor tube lies centrally within a bundle of hollow fibers 3 so that feed gas flows over the outer surfaces 2 of the fibers and permeates selectively to their bores 4. Lengths of fiber are potted into end-plugs 7, and open fiber bores 5 appear at each end-plug. Non-permeated gas residue leaves the shell via outlet 6. The flow mode in such an arrangement is cross-flow. With bore exits at each end bore flow must somewhere be stagnant at about in the center of each fiber length.

Figure 1B:
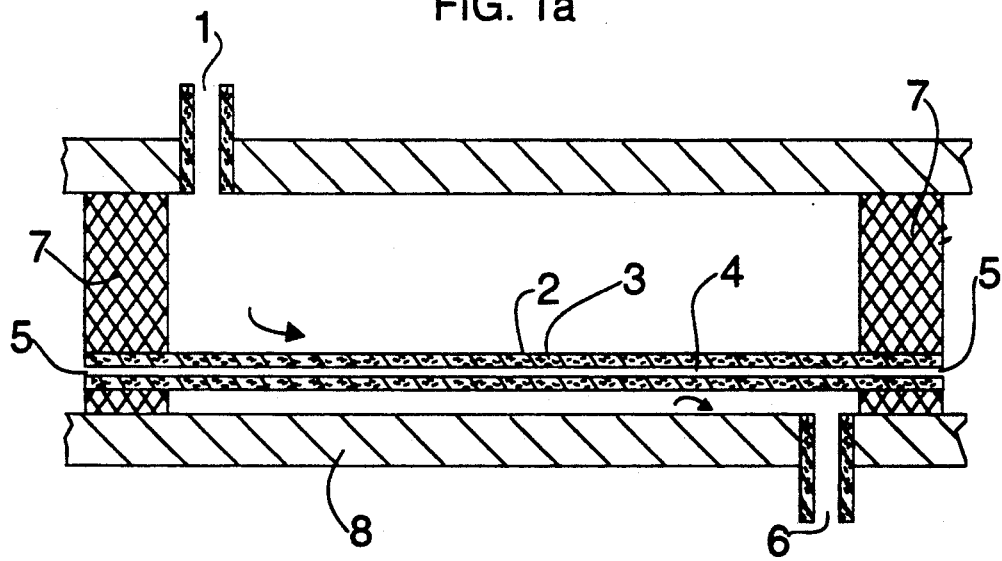

FIG. 1b (Prior art). The features are as in 1a except that feed gas is admitted to the pressure shell via a port 1 and flows generally parallel to fiber 3 toward raffinate exit 6. As diagrammed, permeate may exit at both fiber ends. The flow mode is a combination of parallel coflow and counterflow. The stagnation point in the fiber bore may well be closer to the bundle end near the inlet point 1, since the net total volume of permeate passing through the fiber wall to the bore will be greatest in the surface region of the fiber which is opposite the lowest permeate pressure (adjacent the bore outlet), and is exposed to feed richest in the gas with the highest permeation rate (which is at the feed inlet since as feed progresses toward the outlet 6 the faster gas(es) diminish in concentration.

Figure 1C:
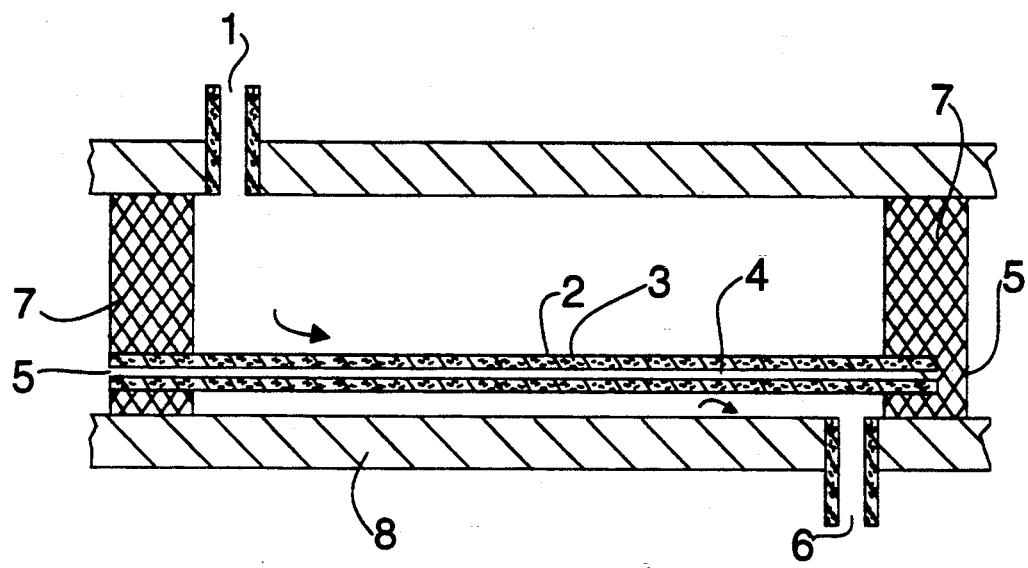

FIG. 1c (Prior art). The features are as in 1b, except that cut lengths of fiber are sealed closed in one end-plug and therefore there is only one outlet for each fiber bore. The bore stagnation point must be at the closed end; all bore flow is toward the open end and therefore it is counter to the flow direction on the shell side of the fibers. The flow mode is parallel counterflow, and is generally regarded as providing the most efficient arrangement for effecting separation.

Figure 1D:
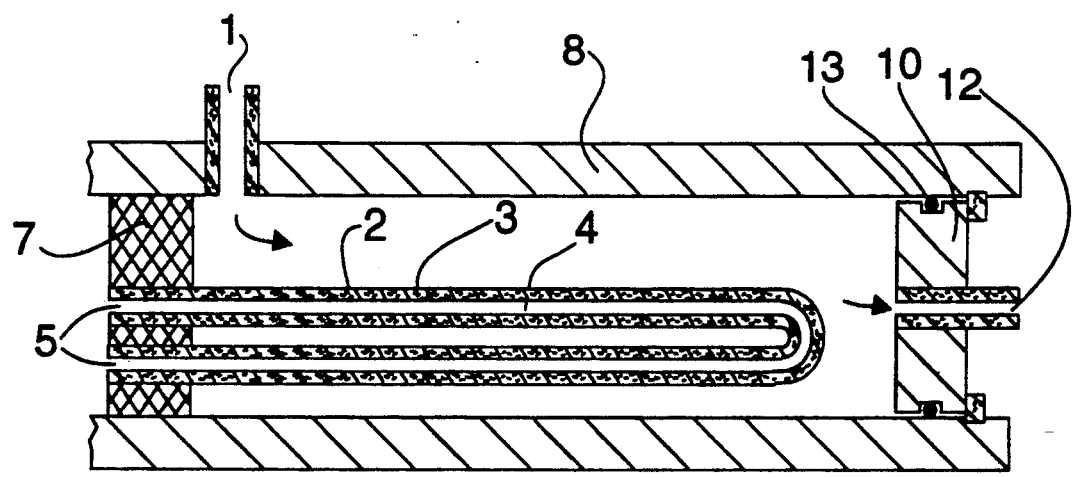

FIG. 1d (Prior art). The features differ from the above examples in that the bundle was formed with re-entrant loops 14. Although one bundle end was potted into an end-plug and sliced to open fiber bores it was not necessary to pot the other end. However, an end plate 10 is shown as providing a closure means whereby pressure is maintained within the shell. Raffinate exiting the bundle in the re-entrant loop regions is shown in this illustration as leaving the pressure vessel via port 12 in the end-plate. The flow mode is primarily parallel counterflow for the majority of the active fiber surface.

Figure 2:
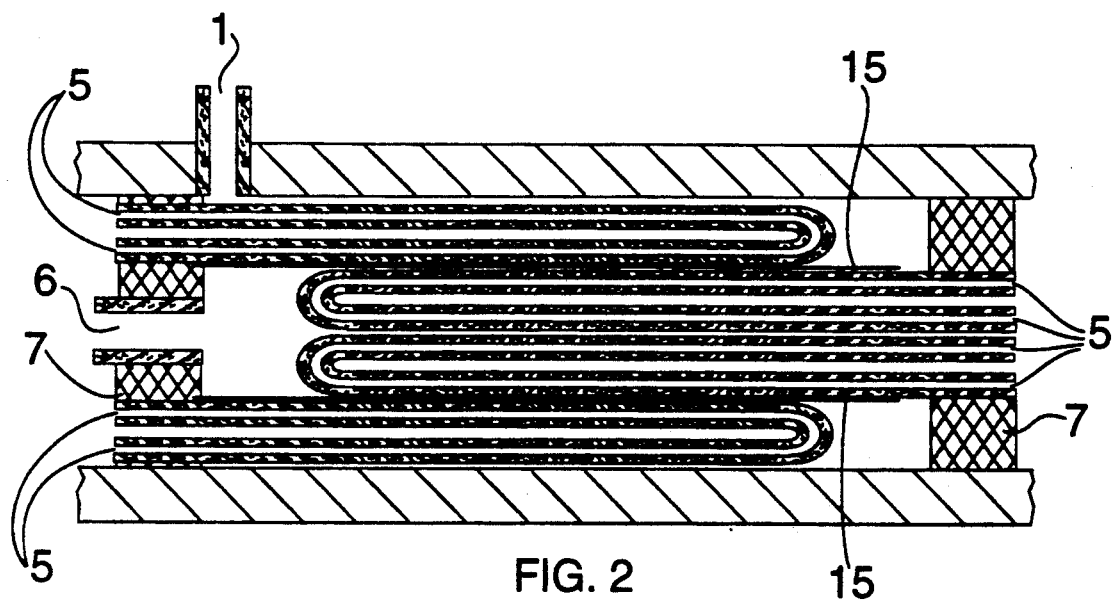
FIGS. 2 and 3 illustrate two alternative arrangements in the prior art for organizing separate zones within a single bundle.

FIG. 2 (Prior art). The features here combine several of those illustrated above except for the interposition of an impervious film 14 between layers of fiber wraps to create two zones within a bundle. The bundle is prepared by winding helical wraps of fiber on a mandrel until a certain layer thickness is reached. There is then applied to the first layer a gas-impervious thin film. Winding is resumed, but the reversal positions of the winding traverse are displaced from those of the first layer so that the two layers are "telescoped".

Each bundle end is potted but due to the axial displacement of the two layers re-entrant loops of each layer are potted at only one end. The film is potted into one end-plug near the feed inlet and therefore feed admitted at 1 is constrained to flow between film 14 and the inner surface of the shell 8 towards the unembedded re-entrant loop region of the first zone of fibers. At that end of the first layer the film is terminated short of the second end-plug. Therefore, the residue of gas left after the feed has passed through the first zone is admitted into the second zone nearest to the second end-plug in which the fibers of the second zone are potted.

Fiber bore outlets of the first zone are all in the first end-plug and therefore first zone permeate exits at that end. Fiber bores of the second zone are all in the second end-plug and therefore the permeate of the second zone exits at the second zone end-plug. There is only one raffinate outlet, namely that from the end of the second zone. Flow modes in each zone are parallel counterflow. Segregating the bundle into two zones within one bundle contributes to improved separation efficiency.

Figure 3:
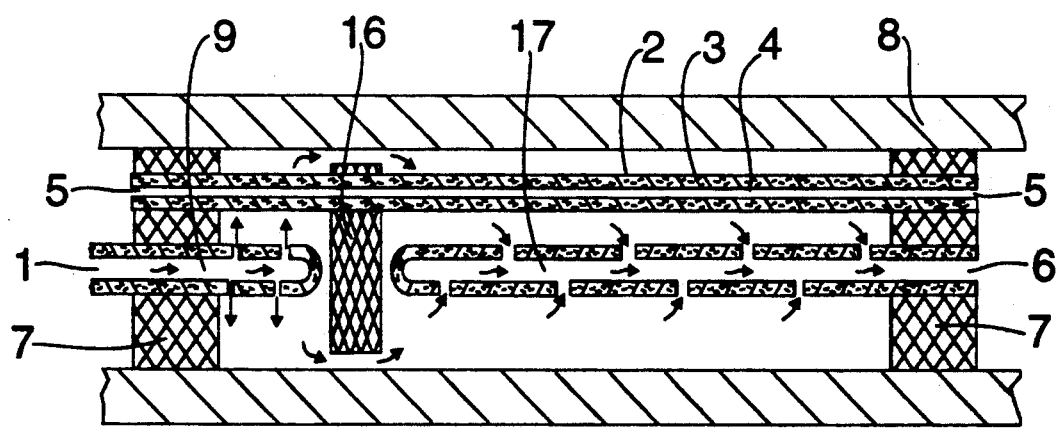

FIG. 3 (Prior art). This arrangement with two zones of fiber employs a barrier between zones as a flow directing device. While the arrangement was first proposed for a liquid extraction process it is a potentially applicable means for effecting gas separation with the use of sweep gas. For this latter application feed would be admitted at 1 into core tube 9 and flow radially toward the inner surface of the pressure shell in a first zone. In the vicinity of the shell the residue gas is conducted over the edge of the barrier into the second zone where it then flows radially inward toward a second perforated tube 17 acting as a raffinate collector. A sweep gas is admitted into fiber bore opening 5 at one end and along with permeate leaves the bundle at the opposite bore opening. The flow mode is cross-flow with permeate sweeping in two stages.

Figure 4:
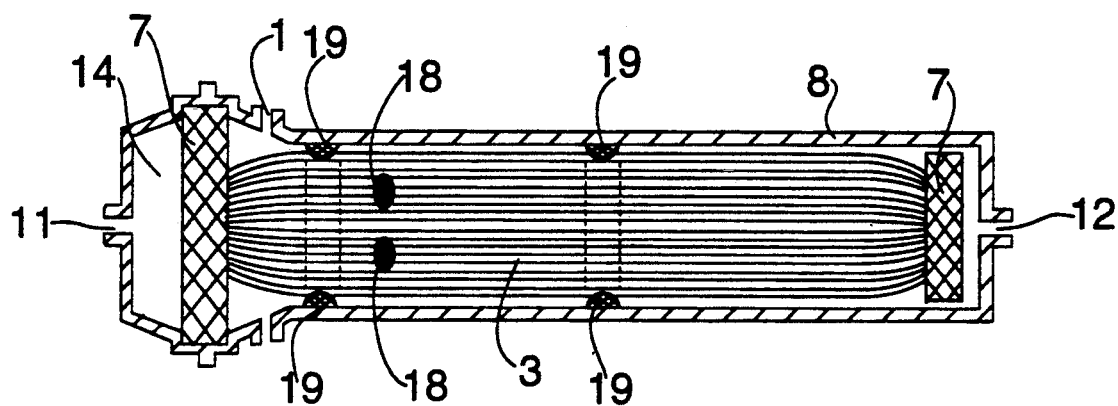
FIG. 4 illustrates prior art use of barriers transverse to the fibers in a bundle to compensate for irregular flow effects.

FIG. 4 (Prior art). This shows an arrangement with barriers disposed in a bundle for flow uniformizing. The flow mode is generally parallel counterflow. However, the bundle assembly was from cut lengths of fiber and the variable packing density required expedients to overcome channeling effects.

FIGS. 5a and 5b (This invention). Several possible cases illustrate this invention. One such case is that wherein cut fiber lengths are sealed closed individually. Sealing each fiber end in this way, while possible, would be quite tedious. However, a method wherein cut length fibers are sealed closed together in a version of a common end-plug is quite readily accomplished and the invention in this version is illustrated in FIG. 5a. Another case involves unembedded re-entrant loops (5b), which is quite a practical configuration and a preferred embodiment.

In both cases the bundle is formed with a barrier 20 which segregates the space within the shell into two regions which are not in fluid communication. The fibers traverse through the barrier with a portion of their surface sealed away from another portion of their surface. Therefore in a first zone I the main active surface area of the fibers may be independently exposed to the main feed and in the second zone II re-entrant loops or sealed ends appear and are accessible to an entirely independent fluid medium since the two zones are not in fluid communication with each other.

For better understanding of the functions these two diagrams are somewhat more detailed than the preceding figures. There is shown an end-plate 10 for closing off the pressure shell and confining a fluid in Zone II. Ports 21 and 22 are indicated and represent the accesses whereby a secondary fluid may be introduced and removed from the Zone II and thereby expose the sealed end or re-entrant loop portions of the fibers to a fluid environment entirely independent of the main fluid which is admitted and removed from the Zone I via access ports 1 and 6. In FIG. 5A there is shown a common sealing element 17 resembling a thin plate embedding and covering all the cut fiber ends in Zone II. The common features of 5a and 5b illustrate how two regions of the fibers may be exposed to two different fluids independently flowing in Zones I and II.

FIG. 6 is a detailed cross-sectional diagram of a preferred embodiment of the present invention. Numerals, wherever feasible, correspond to the features of the preceding figures. The interior of the containment shell is partitioned by a barrier 20 into two zones. A gas mixture enters Zone I under pressure at port 1 and flows in the inter-fiber spaces of the bundle over the surfaces of the main portion of the fiber lengths in a direction generally parallel to the fiber axes. For simplicity, as before, only a single fiber 3 is shown. Due to permselectivity of the hollow fiber membrane one or more components of the feed permeates the fiber wall to the bore more rapidly than some other(s). Permeate enters the fiber bore and flows toward bore open ends 5 created by slicing potting plug 7. FIG. 6 shows a single slice and its associated collection space 14. In practice several oblique slices displaced circumferentially around the plug are made to intercept all the fibers of the bundle.

Permeate is withdrawn from the module via egress port 11 in end-plate 10. The latter is held in place against the thrust of fluid pressure of gas flowing over the bundle by a ring 18 threaded into the pressure shell 8. This is an optional feature; the end-plate can be a bolted flange or can be secured to the shell by a snap-ring nested in a groove in the shell. O-rings 13 make gas-tight seals in several places: between end-plates and shell, between end-plates and collector tube 16, and between barrier 20 and shell. The gas mixture admitted to Zone I adjacent potting plug 7 is induced to flow toward the barrier 20 where drill-holes 23 in collector tube 16 connect to the central channel thereof and thereby to port 12 via which, having been depleted of part of its initial composition, pressurized residue (raffinate) leaves the module.

It should be noted that while the collector tube 16 runs from one end of the module to the other passing through end-plates at each end, the central channel of the tube is plugged or left un-drilled where it passes through and is sealed to the barrier 20. Therefore raffinate entering the channel via drill holes 23 can flow only toward the tube outlet 12. Another set of drill holes 24 connect Zone II to a second and independent channel portion of the collector tube which communicates with an access port 22. The surfaces of fiber re-entrant loops which lie in Zone II are maintained in some selected fluid environment to be described below by the flow of a fluid into and out of Zone II via ports 21 and 22. To facilitate the distribution of this fluid in Zone II a baffle 15 is provided.

By contrast with the situation in Zone I where it is desirable for feed to flow parallel to the fiber axes over the greatest part of their length, the fiber portions in Zone II are too short to permit development of axial flow. Indeed, there is very little advantage, if any, to axial flow in Zone II. Therefore, the drill holes 24 may be advantageously located not only adjacent the barrier but also distributed along the length of the collector tube 16 in Zone II, as illustrated by a second drill hole 24. The object here is to provide uniform radial flow over the re-entrant loops of fibers While the collector tube arrangement shown in FIG. 6 is part of one preferred embodiment it should be noted that there may be other configurations for this feature which also embody the invention.

There are two general approaches to forming a barrier 20 with re-entrant loops exposed on one side thereof and the main active fiber lengths on the other. One approach calls for applying the barrier layer material during the bundle assembly. The other entails creating the barrier after bundle assembly. Variants of these two approaches will be different depending on whether the bundle is formed from assembled cut lengths or by winding continuous lengths of fiber. Any such methods may be inventive as such but are not a part of this instant invention.

However, it should be noted that besides the arrangement shown in FIG. 6 the instant invention also contemplates an arrangement wherein the collector tube lies only in Zone I, extending through the end-plate defining said Zone at one end and terminating within or adjacent to the barrier without traversing through Zone II to the end-plate defining Zone II. In this latter arrangement re-entrant loops or sealed fiber stubs may be exposed to a selected fluid environment different from that of Zone I without the mediation of flow from or to a central collector tube portion in Zone II.

Feed fluid in Zone I is at some pressure which may be the same or different from that of the fluid in Zone II. If Zone I fluid pressure is higher than that of Zone II mechanical thrust acting against the barrier 20 would tend to push it toward the end-plate defining Zone II. To withstand this pressure a rigid support ring 19 is installed which carries part of the load on the barrier to that end-plate and in turn to the shell via the threaded ring.

In many applications of the instant invention the permselective quality of the main fiber portions lying in Zone I will be the same as the permselective quality of the re-entrant loop regions lying in Zone II. However, one familiar with membrane chemistry and physics will recognize that once the bundle is formed and before it is put into operation one can modify the characteristics of the fiber surfaces in either zone without so modifying the surfaces in the other zone. For example, if the fiber is a composite membrane, the coating on the fiber in Zone II can be selectively removed or otherwise treated to modify its selectivity without simultaneously so modifying the selectivity of the main fiber portions in Zone I.

APPLICATIONS OF THE INVENTION

There are several possible ways in which the two-zone features of the instant module design may be employed. Three examples will be described.

EXAMPLE 1

It is well known that the recovery fraction and level of purity of nitrogen produced from a pressurized air feed to a conventional permselective membrane process are inversely related. To achieve higher nitrogen purity while maintaining high recovery it is often considered advantageous to employ a sweep gas to remove permeated oxygen more efficiently from the permeate side of the membrane. The instant module design can achieve this result quite effectively. The permselective qualities of the fiber portions lying in Zone II are kept the same as in Zone I; air under pressure is the fluid fed to Zone I; the fluid in Zone II is a water vapor-saturated gas, for example, a low pressure stream of recirculating nitrogen-enriched air which has been warmed and saturated with water vapor. The relevance of these operational features will be understood from the following.

The characteristics of virtually all known membranes in respect to the solution/diffusion separation of gases favor the transport of oxygen over nitrogen. The ratio of their permeances, (the variable known as "selectivity"), may lie between 2 and 20 or more. By the same token, the permeation rate of water vapor is greatly favored over all other gases, including oxygen. It is not uncommon that in the same membrane water will permeate 100 to 1000 times faster than such other gases as oxygen or nitrogen. The effect of this is that when a typical compressed air stream is fed to a membrane the water vapor in it is by far the most favored species to permeate.

Thus, the first portion of a membrane surface which is exposed to such a feed acts to dehydrate it. To be sure, oxygen is also selectively permeated over nitrogen, but as the feed flows over the surface of the membrane it becomes quite dry well before it becomes a raffinate with a useful nitrogen purity level. Water vapor permeated to the downstream surface of the membrane near the feed inlet provides a sweep effect for the other components of the permeate, but this effect is confined to the first portion of membrane and is lost long before feed reaches the last portions of the membrane surface. In the case of a hollow fiber membrane with feed on the outside of the fiber, the membrane downstream surface is of course, facing the bore. To facilitate separation it has been known to provide a module having fibers with both bore ends open and at opposite ends of the module so that a sweep gas may be propelled through the bore from one end to the other. Similar salutory effects can be achieved by use of the instant invention.

As in a typical hollow fiber module used for air separation, air is fed to Zone I compressed to about 100 to 500 lb/in$^2$, typically about 125 lb/in$^2$ which is a convenient standard operating pressure for air compressors. The compressed air may or may not be cooled, but it is almost invariably saturated with water vapor after compression. When this gas is fed to any hollow fiber module, the raffinate retains essentially the feed pressure (i.e. 125 lb/in$^2$ for example). The pressure of the permeate in the bore of the fiber is lowest near its outlet and rises toward the closed end, or the re-entrant loop region. Bore flow velocity is highest near the outlet and approaches stagnation nearest the closed end or re-entrant loops. Composition of the gas in the bore at any point is determined both by the feed composition on the surface opposite that point and the composition of the gas flowing past that point in the bore.

In a typical practical prior art case the absolute pressure in the bore at the stagnation zone would be about 15 to 25 lb/in$^2$ and the composition is likely to be about 10-20% oxygen, the balance nitrogen. Thus the oxygen partial pressure would be about 1.5-5.0 lb/in$^2$ in the bore at the closed ends or re-entrant loops. As a result the oxygen pressure in the raffinate cannot be lower than about 2-10 lb/in hence nitrogen purity cannot be greater than 95-98%. Improving the purity of the raffinate nitrogen at the same level of recovery would require that the raffinate as it leaves the module be in contact with a membrane surface whose adjacent bore gas is less rich in oxygen.

The instant module design makes it convenient to achieve this by providing water vapor as a sweep gas. This is accomplished by the continuous application of a suitable water vapor-saturated gas to the the fiber portions in Zone II. For example, the gas may be a small fraction of the nitrogen-enriched product of the main air separation process. The pressure of the gas in Zone II need not be much greater than the bore pressure, namely 15-20 lb/in$^2$. A small stream of the raffinate of Zone I is led to a separate recirculation system where it is allowed to expand and re-saturate with water vapor. Zone II is fed by this system.

As a result of the pressure and composition of the gas provided by the system supplying Zone II, the primary permeate across the membrane portions lying in Zone II is water vapor with some carrier gas which join with the permeate arising from Zone I. Where the two permeates mingle that from Zone I is largely nitrogen. The nitrogen part of the permeate from Zone II suppresses permeation of nitrogen from the raffinate in Zone I. The principal salutory effect, however, is that the contents of the bore are induced to flow toward the bore outlet in the location where flow would normally be essentially stagnant at the point opposite to where the raffinate is last in contact with the membrane. Moreover, the oxygen concentration is diluted both at that point and everywhere else along the bore by water vapor permeated from the Zone II gas.

The effect of these factors is to foster depletion of the oxygen left in the raffinate and consequently improve the purity of the nitrogen-enriched air fraction in Zone I without loss of yield. The volume of nitrogen-enriched air required for recirculation in Zone II is trivial compared to the volume of raffinate produced in Zone I and the nitrogen lost to the bore from Zone II is compensated by an amount not lost from the raffinate of Zone I.

EXAMPLE 2

Zone I is fed with compressed air as in Example I. Zone II is flooded with a hygroscopic liquid such as polyethylene glycol which has little or no capacity to permeate the membrane. The Zone II liquid is kept loaded with water by recirculation to a re-wetting station. It may also be deliberately warmed. The water vapor pressure of the solution is such that water vapor permeates across the membrane to the fiber bores at their closed ends or re-entrant loops. The influence of this added gas component in the otherwise dry stagnant gas would be similar to that discussed above in Example 1.

EXAMPLE 3

This situation contemplates that the hollow fibers are composite membranes with a coating on their outer surfaces. Membrane portions in Zone II have been treated to remove the permselective film from the substrate hollow fiber. The character of the substrate is such that it is capable of effecting Knudsen flow separation of gases. Zone II is kept under a pressure lower than the highest pressure in the bores of the fibers; this may be a vacuum. Permeate from Zone I feed which has accumulated in the bores will be induced to re-cross the membrane into Zone II. But, if the faster gas in Knudsen flow is also the faster gas in the solution/diffusion separation caused by the intact composite membrane surfaces in Zone I, the permeate from that zone within the bore regions lying in Zone II will selectively diffuse into Zone II for eventual exit from the module. The net effect is to enhance the Zone I depletion of the faster gas and thereby Zone I separation efficiency.

Having described my invention in general and at least one of its preferred embodiments in detail, and having described three methods of operating the invention to provide significant improvements over the known and practiced art of hollow fiber membrane separation I therefore claim:

1. The method of separating components of a fluid mixture by contacting the fluid with external surfaces of permselective hollow fiber membranes in the form of an axially extensive bundle enclosed in a containment vessel having a fluid-impervious barrier disposed transversely to the bundle in fluid-tight contact with the bundle containment vessel which thereby defines two zones not in direct fluid communication and the external surfaces of the fibers are segregated into two regions, wherein:
    (a) the fluid mixture contacts a first external region of said fibers in a first zone defined by said barrier and a first bundle end embedded in an end-plug in which all the fibers are potted and their bores are open; and
    (b) a second fluid contacts the second external surface region of the fibers in a second zone defined by said barrier and the second bundle end where the fibers form re-entrant loops or sealed stubs so that no bores are open at the second end.

2. The method of claim 1 in which the fluid mixture and the second fluid are at different pressures.

3. The method of claim 1 in which the fluid mixture and the second fluid are both gases.

4. The method of claim 3 in which the gases are dissimilar in composition.

5. The method of claim 1 in which the fluid mixture is a gas and the second fluid is a liquid.

6. The method of claim 1 in which the fluid mixture is air and the pressure in the bores is maintained below atmospheric pressure.

7. The method of claim 6 in which the second fluid is a water-saturated gas.

8. A membrane module for selective separation of components of a fluid mixture comprising a bundle of permselective hollow fiber membranes in combination with a containment vessel wherein there is disposed across the bundle transversely to its axis a fluid-impervious barrier in fluid-tight relationship with said containment vessel thereby creating two zones within the vessel which are not in direct fluid communication with one another and the external surfaces of the hollow fibers are segregated so that a first region of said surfaces lies in one of said zones and a second region of said surfaces lies in the other of said zones and the fluid environments of the two said regions can be independently controlled, and wherein:
    (a) the bundle is embedded in a potting material at a first end where open fiber bores are in unobstructed fluid communication with a module 9. The module of claim 8 wherein the barrier defining the two zones lies closer to said second end than said first end.

10. The module of claim 8 wherein separate access means is provided to each of the two zones whereby two fluid streams may be separately admitted to make independent contact with the segregated membrane surface regions in said zones.

11. The module of claim 8 wherein the segregated regions have different perselective properties.

* * * * *